United States Patent
Chang et al.

(10) Patent No.: US 10,552,662 B2
(45) Date of Patent: Feb. 4, 2020

(54) OPTICAL IDENTIFICATION METHOD

(71) Applicant: BEYOND TIME INVESTMENTS LIMITED, Eden Island, Mahé OT (SC)

(72) Inventors: Chu-Hsin Chang, Zhubei (TW); Jun-Shian Hsiao, Chupei (TW); Chun-Fu Lin, Chupei (TW); Hui-Min Tsai, Taipei (TW)

(73) Assignee: BEYOND TIME INVESTMENTS LIMITED, Eden Island, Mahé (SC)

( * ) Notice: Subject to any disclaimer, the term of this patent is extended or adjusted under 35 U.S.C. 154(b) by 61 days.

(21) Appl. No.: 15/858,841

(22) Filed: Dec. 29, 2017

(65) Prior Publication Data

US 2018/0189546 A1 Jul. 5, 2018

Related U.S. Application Data

(60) Provisional application No. 62/440,746, filed on Dec. 30, 2016.

(30) Foreign Application Priority Data

Jul. 31, 2017 (TW) .............................. 106125735 A (51) Int. Cl.
*G06K 9/00* (2006.01)
*G06K 9/46* (2006.01)
*G06K 9/20* (2006.01)

(52) U.S. Cl.
CPC ...... *G06K 9/00107* (2013.01); *G06K 9/00033* (2013.01); *G06K 9/00114* (2013.01); *G06K 9/00885* (2013.01); *G06K 9/2027* (2013.01); *G06K 9/4661* (2013.01); *G06K 2009/00939* (2013.01)

(58) Field of Classification Search
CPC ..... G06K 2009/00939; G06K 9/00107; G06K 9/00885; G06K 9/4661
See application file for complete search history.

(56) References Cited

U.S. PATENT DOCUMENTS

| | | | |
|---|---|---|---|
| 6,072,895 A * | 6/2000 | Bolle | G06K 9/00067 382/125 |
| 8,542,879 B1 * | 9/2013 | Nechyba | G06K 9/00228 382/103 |
| 9,367,729 B2 * | 6/2016 | Schuckers | G06K 9/00114 |

(Continued)

*Primary Examiner* — Bhavesh M Mehta
*Assistant Examiner* — Ian L Lemieux
(74) *Attorney, Agent, or Firm* — Tung & Associates (57) ABSTRACT

An optical identification method, includes: projecting light on a finger to generate reflected light from the finger; receiving the reflected light by a pixel sensing array to obtain a plurality of finger images; and determining whether the finger images present a liveness characteristic, according to a required exposure time or average brightness of the finger images obtained by the pixel sensing array. When the finger images present the liveness characteristic, the optical identification method further includes: determining identification information according to the finger images; or when the finger images do not present the liveness characteristic, the optical identification method further includes: not determining identification information according to the finger images, and optionally, stopping the pixel sensing array from obtaining a subsequent finger image.

11 Claims, 3 Drawing Sheets

(56) References Cited

U.S. PATENT DOCUMENTS

| | | | | |
|---|---|---|---|---|
| 2008/0025579 A1* | 1/2008 | Sidlauskas | ............ | G06K 9/0004 |
| | | | | 382/124 |
| 2008/0025580 A1* | 1/2008 | Sidlauskas | ............ | G06K 9/0012 |
| | | | | 382/124 |
| 2008/0101664 A1* | 5/2008 | Perez | ..................... | G01C 11/04 |
| | | | | 382/125 |
| 2008/0181466 A1* | 7/2008 | Iizuka | ................ | G06K 9/00013 |
| | | | | 382/115 |
| 2008/0253625 A1* | 10/2008 | Schuckers | .......... | G06K 9/00114 |
| | | | | 382/125 |
| 2014/0270404 A1* | 9/2014 | Hanna | ................ | G06Q 30/0609 |
| | | | | 382/116 |
| 2014/0270409 A1* | 9/2014 | Hanna | ................ | G06Q 30/0609 |
| | | | | 382/118 |
| 2014/0286548 A1* | 9/2014 | Shin | ................... | G06K 9/00114 |
| | | | | 382/127 |
| 2014/0294262 A1* | 10/2014 | Schuckers | .......... | G06K 9/00114 |
| | | | | 382/125 |
| 2015/0169931 A1* | 6/2015 | Chiang | ................ | G06K 9/0012 |
| | | | | 382/124 |
| 2016/0070968 A1* | 3/2016 | Gu | ..................... | G06K 9/00093 |
| | | | | 382/125 |
| 2016/0232401 A1* | 8/2016 | Hoyos | ....................... | G06T 7/11 |
| 2017/0325721 A1* | 11/2017 | Matsuda | ................ | A61B 5/117 |
| 2018/0018492 A1* | 1/2018 | Vilenskii | ............ | G06K 9/0004 |
| 2018/0025202 A1* | 1/2018 | Ryshtun | ............... | G06K 9/0012 |
| | | | | 382/124 |
| 2018/0129858 A1* | 5/2018 | Russo | ................ | G06K 9/00087 |

* cited by examiner

OPTICAL IDENTIFICATION METHOD

CROSS REFERENCE

The present invention claims priority to U.S. 62/440,746, filed on Dec. 30, 2016, and TW 106125735, filed on Jul. 31, 2017.

BACKGROUND OF THE INVENTION

Field of Invention

The present invention relates to an optical identification method, to sense both a liveness characteristic and a fingerprint feature, according to a finger image obtained by the same pixel sensing array with the same light source, so as to provide a better authentication function without a cost increase.

Description of Related Art

Fingerprint identification is a known technique for authentication. However, although conventional optical identification systems can identify different fingerprints to distinguish different persons, nowadays fake fingerprint imitation technique is much improved. a person with a malice intent can fool such conventional optical identification systems by a fake imitated fingerprint image to let the optical identification system believe that he is the correct user. Thus, an authentication system only based on identifying the fingerprint pattern is not safe enough.

Besides, prior art capacitive sensors can be applied to determine a touch and a motion of the finger, according to a press motion of the finger. However, the prior art capacitive sensors are not capable of distinguishing the fingerprint of the finger, nor capable of identifying the identification of the person performing the press motion according to the fingerprint.

SUMMARY OF THE INVENTION

In one perspective, the present invention provides an optical identification method, which includes: projecting light on a finger to generate reflected light from the finger; receiving the reflected light by a pixel sensing array to obtain a plurality of finger images; and determining whether the finger images present a liveness characteristic according to a required exposure time or an average brightness of each of the finger images obtained by the pixel sensing array; wherein, when the finger images present the liveness characteristic, the optical identification method further comprises: determining identification information according to the finger images; or when the finger images do not present the liveness characteristic, the optical identification method further comprises: not determining identification information according to the finger images. When the finger images do not present the liveness characteristic, the optical identification method further comprises: stopping the pixel sensing array from obtaining a subsequent finger image.

In one embodiment, the optical identification method further includes: determining whether the finger images obtained by the pixel sensing array present a motion status or not, wherein when the finger images present the motion status, the optical identification method further comprises: stopping the pixel sensing array from obtaining a subsequent finger image.

In one embodiment, the pixel sensing array has a dynamic range and a required exposure time of each finger image is determined according to the dynamic range, wherein the step of determining whether the finger images present the liveness characteristic includes: determining whether the required exposure time of each finger image is in a range defined by an exposure time threshold, wherein when the required exposure time is in the range defined by the exposure time threshold, the corresponding finger image is determined to present the liveness characteristic; or when the required exposure time is not in the defined range, the corresponding finger image is determined not to present the liveness characteristic.

In one embodiment, the exposure time threshold includes: an upper exposure time threshold, a lower exposure time threshold, or a combination of an upper exposure time threshold and a lower exposure time threshold.

In one embodiment, the pixel sensing array has a sensing duration time for receiving the reflected light to obtain the finger images, and the average brightness of each of the finger images is related to the sensing duration time, wherein the step of determining whether the finger images present the liveness characteristic includes: determining whether the average brightness of each of the finger images is in a range defined by a brightness threshold, wherein when the average brightness is in the defined range, the corresponding finger image is determined to present the liveness characteristic; or when the average brightness is not in the defined range, the corresponding finger image is determined not to present the liveness characteristic.

In one embodiment, the brightness threshold includes: an upper brightness threshold, a lower brightness threshold, or a combination of an upper brightness threshold and a lower brightness threshold.

In one embodiment, the aforementioned step of determining whether the finger images present the liveness characteristic according to the average brightness of each of the finger images obtained by the pixel sensing array, includes: determining whether the finger images present the liveness characteristic according to a difference (average brightness difference) between the average brightness of the finger images.

In one embodiment, the aforementioned step of determining whether the finger images present the liveness characteristic according to the average brightness difference between the average brightness of the finger images, includes: setting the average brightness of one finger image as a first reference; comparing the average brightness of at least one subsequent finger image obtained next to the one finger image with the first reference, to obtain an offset value; determining whether the offset value is higher than an offset threshold; setting the average brightness of another finger image as a second reference; comparing the average brightness of at least one subsequent finger image next to the another finger image with the second reference, to obtain another offset value; determining whether the another offset value is higher than the offset threshold; and when a count of the offset values higher than the offset threshold is higher than a count threshold, the finger images are determined to present the liveness characteristic.

In one embodiment, the finger images include: a first finger image, a second finger image obtained after the first finger image, a first comparison group, and a second comparison group. The first comparison group includes a plurality of finger images beginning with the first finger image, and the second comparison group includes the second finger image and at least one finger image obtained after the second finger image, wherein the first comparison group includes the second finger image but does not include the at least one finger image obtained after the second finger image. The step of determining whether the finger images present the liveness characteristic according to the average brightness difference between the average brightness of the finger images includes: obtaining the average brightness of each of the finger images; comparing the average brightness of each of the finger images in the first comparison group with the average brightness of the first finger image, to obtain the average brightness difference of each of the finger images in the first comparison group; comparing the average brightness of the at least one finger image in the second comparison group with the average brightness of the second finger image, to obtain the average brightness difference of each of the at least one finger image in the second comparison group; counting a number of the average brightness differences of the finger images in the first and second comparison groups which are higher than a predetermined offset threshold; and when the count is higher than a predetermined count threshold, the finger images are determined to present the liveness characteristic.

In one embodiment, the offset threshold is determined according to a breathing characteristic or a heartbeat characteristic of a user.

In one embodiment, the identification information of the finger includes a fingerprint or a motion trajectory of the finger.

DESCRIPTION OF THE PREFERRED EMBODIMENTS

The drawings as referred to throughout the description of the present invention are for illustrative purpose only, to show the interrelations between the components, but not drawn according to actual scale.

Figure 1:
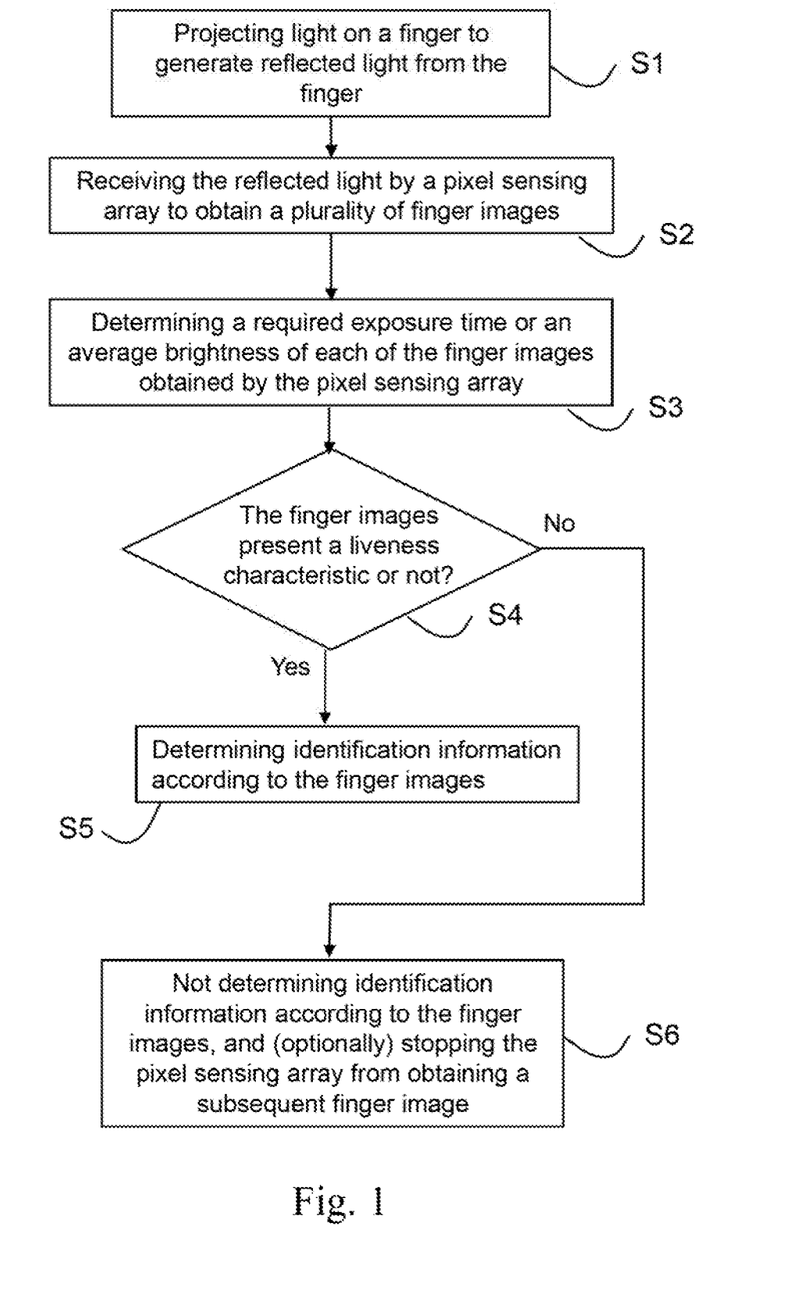
FIG. 1 shows a flow chart of an optical identification method according to one embodiment of the present invention.

FIG. 1 shows an optical identification method according to one perspective of the present invention, which includes: projecting light on a finger, to generate reflected light from the finger (S1); receiving the reflected light by a pixel sensing array to obtain a plurality of finger images (S2); determining a required exposure time or an average brightness of each of the finger images obtained by the pixel sensing array (S3); and determining whether the finger images present a liveness characteristic or not, according to the required exposure time or the average brightness of each of the finger images obtained by the pixel sensing array (S4); wherein when the finger images present the liveness characteristic, the optical identification method further includes: determining identification information according to the finger images (S5); or when the finger images do not present the liveness characteristic, the optical identification method further includes: not determining identification information according to the finger images, and optionally, the pixel sensing array may be stopped from obtaining a subsequent finger image (S6).

Figure 2:
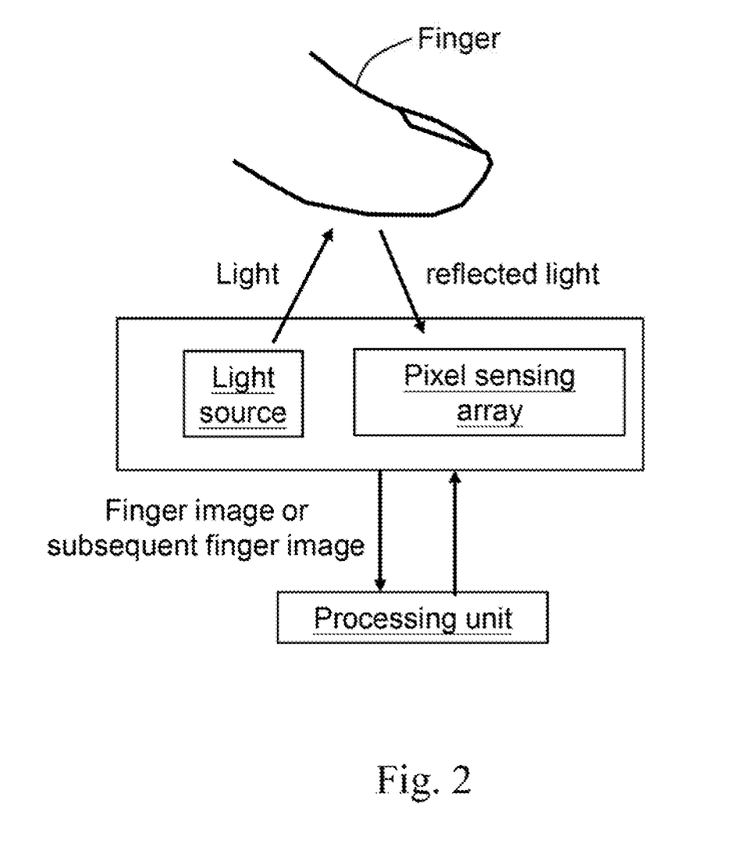
FIG. 2 shows one embodiment of sensing a finger image according to the present invention.

Regarding the steps S1, S2, S3, and S4 of the optical identification method provided by the present invention, FIG. 2 shows one embodiment of sensing a finger image. In FIG. 2, a light source projects light on a finger, to generate reflected light from the finger. The pixel sensing array receives the reflected light to generate a plurality of finger images and/or a plurality of subsequent finger images, for determining whether the finger images present the liveness characteristic, and determining identification information. Importantly, the liveness characteristic and the identification information are both determined according to the finger images obtained by the same pixel sensing array and the same light source. The prior art optical identification system is incapable of distinguishing whether the obtained fingerprint is a fake imitation or not. The prior art capacitive sensor can only determine a motion of the finger, but is not capable of determining whether a sensed object touching the sensor is a live finger or not. In comparison with the prior art, the present invention can determine whether the finger images obtained by the pixel sensing array present a liveness characteristic, according to the required exposure time or the average brightness for obtaining the finger images, to provide a better authentication security. Further, the function of determining the liveness characteristic and the function of determining the identification information are both achieved according to the finger images generated by the same pixel sensing array with the same light source. The details will be explained below.

The aforementioned average brightness of each finger image for example may be an average brightness of all pixels of each finger image. That is, (the average brightness of each finger image)=(a sum of the brightness of all pixels of the each finger image)/(a number of all pixels of the each finger image). Or, in another embodiment, the average brightness of each finger image is obtained by the average brightness according to a portion of pixels of each finger image; for example, pixels having brightness brighter than an upper threshold or darker than a lower threshold, or pixels located at an edge area of the image, etc., can be excluded.

Figure 3:
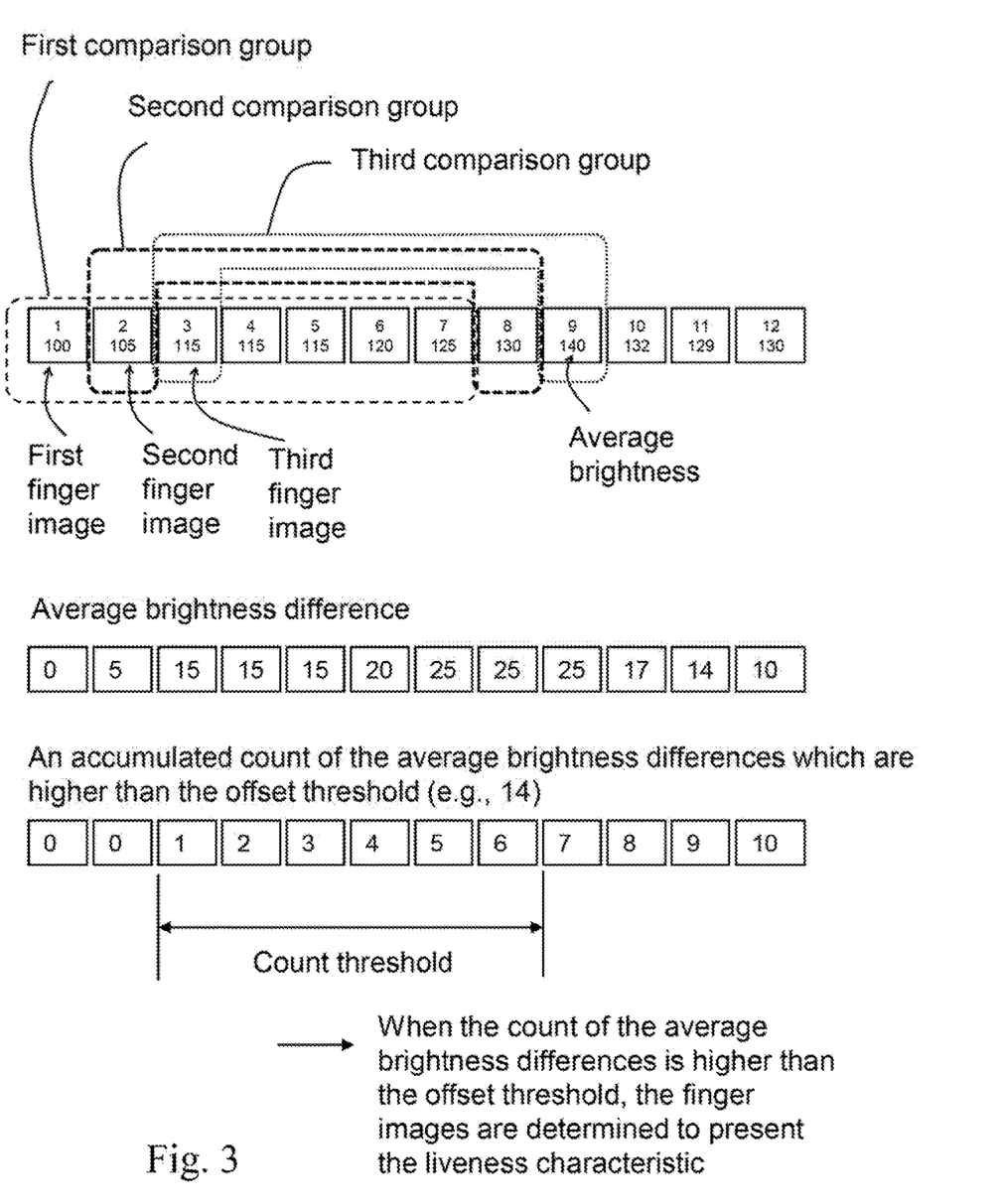
FIG. 3 shows one embodiment of determining a liveness characteristic according to the present invention.

In FIG. 3, assuming that the brightness of a pixel is in a range between 0 and 255, the average brightness of the first finger image is 100, and the average brightness of the second finger image is 105, indicating that the average brightness of the obtained finger images is close to a middle brightness range (in a middle range between 0 and 255), and the average brightness of the obtained finger images is increasing.

According to the present invention, when the finger moves during the step of determining whether the finger images present a liveness characteristic, a determination based on the obtained finger images could be incorrect. In one embodiment, the optical identification method further includes: determining whether the finger images obtained by the pixel sensing array present a motion status or not, wherein when the finger images present the motion status, the optical identification method further includes: stopping the pixel sensing array from obtaining a subsequent finger image.

In one embodiment, the pixel sensing array has a dynamic range, and a required exposure time of each finger image is decided according to this dynamic range. For example, when the sensed object has a poor reflectivity, the required exposure time is longer, while, when the sensed object has a good reflectivity, the required exposure time is shorter. Generally, the reflectivity of an imitated fingerprint is different from the reflectivity of a fingerprint with the liveness characteristic; therefore, in the same dynamic range, the required exposure time of the imitated fingerprint is different from the required exposure time of the fingerprint with the liveness characteristic.

In one embodiment, the liveness characteristic may be determined according to an exposure time threshold. The exposure time threshold for example can be an upper exposure time threshold, a lower exposure time threshold, or a combination of the upper exposure time threshold and the lower exposure time threshold. In one embodiment, the upper exposure time threshold can be decided according to the longest required exposure time of the finger images presenting the liveness characteristic. That is, a finger image having a required exposure time higher than the upper exposure time threshold is determined not to present the liveness characteristic, while, a finger image having a required exposure time lower than the upper exposure time threshold is determined to present the liveness characteristic. Or, in another embodiment, the lower exposure time threshold can be decided according to the shortest required exposure time of the finger images presenting the liveness characteristic. Or, in another embodiment, the upper exposure time threshold and the lower exposure time threshold are respectively decided according to the longest required exposure time and the shortest required exposure time of the finger images presenting the liveness characteristic. Accordingly, in one embodiment, the aforementioned step of determining whether the finger images present the liveness characteristic includes: when the required exposure time of the finger images is lower than the upper exposure time threshold, the finger images are determined to present the liveness characteristic; otherwise, when the required exposure time of the finger images is higher than the upper exposure time threshold, the finger images are determined not to present the liveness characteristic. Or, in another embodiment, the aforementioned step includes: when the required exposure time of the finger images is higher than the lower exposure time threshold, the finger images are determined to present the liveness characteristic; otherwise, when the required exposure time of the finger images is lower than the lower exposure time threshold, the finger images are determined not to present the liveness characteristic. Or, in another embodiment, the aforementioned step includes: when the required exposure time of the finger images is in a range between the upper exposure time threshold and the lower exposure time threshold, the finger images are determined to present the liveness characteristic; otherwise, when the required exposure time of the finger images is not in the range between the upper exposure time threshold and the lower exposure time threshold, the finger images are determined not to present the liveness characteristic.

In one embodiment, the pixel sensing array has a sensing duration time for receiving the reflected light to generate the finger images, and each finger image may include individual average brightness according to the sensing duration time. For example, when the sensed object has a poor reflectivity, the average brightness of the finger images is lower. When the sensed object has a good reflectivity, the average brightness of the finger images is higher. Generally, the reflectivity of an imitated fingerprint is different from the reflectivity of a fingerprint with the liveness characteristic. Therefore, by the same sensing duration time, a range of the average brightness of the imitated fingerprint, is different from a range of the average brightness of the fingerprint with the liveness characteristic.

In one embodiment, the liveness characteristic of each finger image may be determined according to a brightness threshold. The brightness threshold for example can be: an upper brightness threshold, a lower brightness threshold, or a combination of an upper brightness threshold and a lower brightness threshold. For example, the lower brightness threshold is determined according to the lowest average brightness of the finger images presenting the liveness characteristic. When the average brightness of a finger image is lower than the lower brightness threshold, the finger image is determined not to present the liveness characteristic. When the average brightness of a finger image is higher than the lower brightness threshold, the finger image is determined to present the liveness characteristic. Or, in another embodiment, the upper brightness threshold is determined according to the highest average brightness of the finger images presenting the liveness characteristic. Or, in another embodiment, the lower brightness threshold is determined according to the lowest average brightness of the finger images presenting the liveness characteristic, and the upper brightness threshold is determined according to the highest average brightness of the finger images presenting the liveness characteristic. In one embodiment, the aforementioned step of determining whether the finger images present the liveness characteristic according to the average brightness of the finger images obtained by the pixel sensing array includes: when the average brightness of the finger images is higher than the lower brightness threshold, the finger images are determined to present the liveness characteristic; or when the average brightness of the finger images is lower than the lower brightness threshold, the finger images are determined not to present the liveness characteristic. Or, in another embodiment, the aforementioned step of determining whether the finger images present the liveness characteristic according to the average brightness of the finger images obtained by the pixel sensing array, includes: when the average brightness of the finger images is lower than the upper brightness threshold, the finger images are determined to present the liveness characteristic; or when the average brightness of the finger images is higher than the upper brightness threshold, the finger images are determined not to present the liveness characteristic. Or, in another embodiment, the aforementioned step of determining whether the finger images present the liveness characteristic according to the average brightness of the finger images obtained by the pixel sensing array, includes: when the average brightness of the finger images is in a range between the upper brightness threshold and the lower brightness threshold, the finger images are determined to present the liveness characteristic; or when the average brightness of the finger images is not in the range between the upper brightness threshold and the lower brightness threshold, the finger images are determined not to present the liveness characteristic.

The aforementioned average brightness of the finger images, may be the average brightness of plural finger images, or the average brightness of one finger image. A user may decide how the average brightness is defined according to requirement. For example, when the sensing duration time for the finger image obtained by the pixel sensing array is shorter, the average brightness may be obtained according to a more number of finger images, while, when the sensing duration time for the finger image obtained by the pixel sensing array is longer, the average brightness may be obtained according to just one or a less number of finger images.

In another embodiment, the liveness characteristic may be determined according to a variation between the average brightness of plural finger images, wherein the variation of the average brightness may be caused by breathing, heartbeat, or other vital signs. In one embodiment, the aforementioned step of determining whether the finger images present the liveness characteristic according to the average brightness of the finger images obtained by the pixel sensing array includes: determining whether the finger images present the liveness characteristic according to a difference (referred to herein as "average brightness difference") between the average brightness of the finger images.

To determine whether the finger images present the liveness characteristic according to an average brightness difference between the average brightness of the finger images, can be embodied in various ways. In one embodiment shown in FIG. 3, the finger images include: a first finger image, a second finger image obtained next to the first finger image, a first comparison group, and a second comparison group. The first comparison group includes a plurality of finger images beginning with the first finger image, and the second comparison group includes the second finger image and at least one finger image (eighth finger image, FIG. 3) obtained after the second finger image. The first comparison group includes the second finger image but does not include the at least one finger image (in the embodiment of FIG. 3, the eighth finger image is not included in the first comparison group).

In this embodiment, the aforementioned step of determining whether the finger images present the liveness characteristic according to the average brightness differences between the average brightness of the finger images includes: obtaining the average brightness of each of the finger images; comparing the average brightness of each of the finger images in the first comparison group with the average brightness of the first finger image (obtaining a difference between the average brightness of the second finger image and the average brightness of the first finger image, obtaining a difference between the average brightness of the third finger image and the average brightness of the first finger image, etc.), to obtain the average brightness difference of each of the finger images in the first comparison group (as shown by the average brightness differences 5, 15, . . . in FIG. 3); comparing the average brightness of each of the at least one finger image (e.g., the average brightness of the eighth finger image) in the second comparison group with the average brightness of the second finger image, to obtain the average brightness difference of each of the at least one finger image in the second comparison group (e.g., the average brightness difference of the eighth finger image is 25); setting an offset threshold (e.g., the offset threshold is 14 in FIG. 3) and obtaining a count of the average brightness differences in the first and second comparison groups which are higher than the offset threshold; and setting a count threshold (e.g., the count threshold is 6 in FIG. 3) and when the count is higher than the count threshold, the finger images are determined to present the liveness characteristic. The offset threshold and the count threshold can be other than 14 and 6; the above numbers are just examples.

In one embodiment, the aforementioned offset threshold can be, for example but not limited to, an absolute value. That is, when the average brightness of a later finger image is lower than the average brightness of a previous finger image, and the absolute difference is higher than the offset threshold, it is counted and the count is added by one.

In light of the teaching by the present invention, one skilled in this art can conceive modifications or variations for determining the liveness characteristic. For example, the aforementioned step of determining the finger images to present the liveness characteristic when the count (the count of the average brightness differences of the finger images which are higher than the offset threshold) is higher than the count threshold, may be modified to include: when the count (the average brightness differences of the finger images which are higher than the offset threshold) is higher than another count threshold, the finger images are determined not to present the liveness characteristic. And, when the finger images do not present the liveness characteristic, a frequency (or a number of times) of determining the finger images may be limited, to avoid an unnecessary waste of calculation resource and time in useless determination.

In FIG. 3, the numbers of the finger images in the first comparison group and the second comparison group are different, which is not necessary. In another embodiment, the numbers of the finger images in the first comparison group and the second comparison group may be the same. For example, the first comparison group includes four finger images, and the second comparison group includes four finger images. The numbers of the finger images in the first comparison group and the second comparison group are not limited to the embodiment shown in the figure.

In one embodiment, the offset threshold is determined according to a human breathing characteristic or a human heartbeat characteristic. For example, when the offset threshold is decided according to the breathing characteristic, because breathing has a lower frequency, the offset threshold can be correspondingly set lower. When the offset threshold is decided according to the heartbeat characteristic, because heartbeat has a relatively higher frequency (compared with breathing), the offset threshold can be correspondingly set higher (higher than the offset threshold set according to the breathing characteristic).

In another embodiment, the offset threshold may be decided according to a frequency of obtaining the finger images. For example, when the frequency of obtaining the finger images is lower (time period between two obtained finger images is longer), the average brightness may vary more and the difference is larger, so the offset threshold can be correspondingly set higher. When the frequency of obtaining the finger images is higher (time between two obtained finger images is shorter), the average brightness may vary less and the difference is smaller, so the offset threshold can be correspondingly set lower.

In one embodiment, the count threshold may be decided according to a frequency of obtaining the finger images. For example, when the frequency of obtaining the finger images is lower (time between two obtained finger images is longer), the count threshold can be correspondingly set lower. When the frequency of obtaining the finger images is higher (time period between two obtained finger images is shorter), the count threshold can be correspondingly set higher.

The aforementioned embodiment of FIG. 3 is only an illustrative example, but not to limit the scope of the present invention. As explained in the above, the present invention provides various options for determining the liveness characteristic, including for example but not limited to: determining the liveness characteristic according to the exposure time threshold, determining the liveness characteristic according to the brightness threshold, or determining the liveness characteristic according to the average brightness difference between the average brightness of the finger images. Regarding the aforementioned "determining the liveness characteristic according to the average brightness difference between the average brightness of the finger images", the embodiment of FIG. 3 illustrates an example wherein the average brightness differences between the average brightness of the finger images are continuously calculated, and the comparison basis is adaptively updated.

That is, the average brightness of one of the finger images is used as the comparison basis (the first comparison basis), and the average brightness of the other finger images is compared with the first comparison basis. Later, according to the frequency of obtaining the finger images and/or the type of the liveness characteristic to be determined, the average brightness of another one of the finger images can be used to be the comparison basis (the second comparison basis), and the average brightness of the other finger images is compared with the second comparison basis. The comparison continues and the comparison basis is kept updated; when the count of the average brightness differences of the finger images which are higher than the offset threshold is higher than the count threshold, the finger images are determined to present the liveness characteristic. Those skilled in this art can conceive variations and modifications within the spirit of the present invention. For example, in the embodiment of FIG. 3, after the average brightness of the first finger image is used to be the comparison basis, it is not necessary to use the second finger image to replace the comparison basis. For example, the third finger image may be used to replace the comparison basis, and the average brightness of the eighth finger image is compared with the average brightness of the third finger image, instead of being compared with the average brightness of the second finger image. Those skilled in this art can conceive other variations and modifications within the spirit of the present invention.

In one embodiment, the identification information of the finger includes a fingerprint or a motion trajectory of the finger.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention; for example, there may be additional steps or units inserted between two steps or units shown to be in direct connection in the embodiments, as long as such inserted steps or units do not affect the primary function of the steps or units of the present invention. Besides, an embodiment or a claim of the present invention does not need to attain or include all the objectives, advantages or features described in the above. The abstract and the title are provided for assisting searches and not to be read as limitations to the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. All such modifications and variations should fall within the scope of the present invention.

What is claimed is:

1. An optical identification method, comprising:
   projecting light on a finger to generate reflected light from the finger;
   receiving the reflected light by a pixel sensing array to obtain a plurality of finger images; and
   determining whether the finger images present a liveness characteristic according to a required exposure time or an average brightness of each of the finger images obtained by the pixel sensing array;
   wherein, when the finger images present the liveness characteristic, the optical identification method further comprises: determining identification information according to the finger images; or when the finger images do not present the liveness characteristic, the optical identification method further comprises: not determining identification information according to the finger images;
   wherein the step of determining whether the finger images present the liveness characteristic according to the average brightness of each of the finger images obtained by the pixel sensing array, includes: determining whether the finger images present the liveness characteristic according to an average brightness difference between the average brightness of the finger images.

2. The optical identification method of claim 1, wherein when the finger images do not present the liveness characteristic, the optical identification method further comprises: stopping the pixel sensing array from obtaining a subsequent finger image.

3. The optical identification method of claim 1, further comprising: determining whether the finger images obtained by the pixel sensing array present a motion status or not, wherein when the finger images present the motion status, the optical identification method further comprises: stopping the pixel sensing array from obtaining a subsequent finger image.

4. The optical identification method of claim 1, wherein the pixel sensing array has a dynamic range and a required exposure time of each finger image is determined according to the dynamic range, wherein the step of determining whether the finger images present the liveness characteristic includes: determining whether the required exposure time of each finger image is in a range defined by an exposure time threshold, wherein when the required exposure time is in the range defined by the exposure time threshold, the corresponding finger image is determined to present the liveness characteristic; or when the required exposure time is not in the defined range, the corresponding finger image is determined not to present the liveness characteristic.

5. The optical identification method of claim 4, wherein the exposure time threshold includes: an upper exposure time threshold, a lower exposure time threshold, or a combination of an upper exposure time threshold and a lower exposure time threshold.

6. The optical identification method of claim 1, wherein the pixel sensing array has a sensing duration time for receiving the reflected light to obtain the finger images, and the average brightness of each of the finger images is related to the sensing duration time, wherein the step of determining whether the finger images present the liveness characteristic includes: determining whether the average brightness of each of the finger images is in a range defined by a brightness threshold, wherein when the average brightness is in the defined range, the corresponding finger image is determined to present the liveness characteristic; or when the average brightness is not in the defined range, the corresponding finger image is determined not to present the liveness characteristic.

7. The optical identification method of claim 6, wherein the brightness threshold includes: an upper brightness threshold, a lower brightness threshold, or a combination of an upper brightness threshold and a lower brightness threshold.

8. The optical identification method of claim 1, wherein the step of determining whether the finger images present the liveness characteristic according to the average brightness difference between the average brightness of the finger images, includes:

setting the average brightness of one finger image as a first reference;

comparing the average brightness of at least one subsequent finger image obtained next to the one finger image with the first reference, to obtain an offset value;

determining whether the offset value is higher than an offset threshold;

setting the average brightness of another finger image as a second reference;

comparing the average brightness of at least one subsequent finger image next to the another finger image with the second reference, to obtain another offset value;

determining whether the another offset value is higher than the offset threshold; and when a count of the offset values higher than the offset threshold is higher than a count threshold, the finger images are determined to present the liveness characteristic.

9. The optical identification method of claim 1, wherein the finger images include: a first finger image, a second finger image obtained after the first finger image, a first comparison group, and a second comparison group, wherein the first comparison group includes a plurality of finger images beginning with the first finger image, and the second comparison group includes the second finger image and at least one finger image obtained after the second finger image, wherein the first comparison group includes the second finger image but does not include the at least one finger image obtained after the second finger image, and the step of determining whether the finger images present the liveness characteristic according to the average brightness difference between the average brightness of the finger images includes:

obtaining the average brightness of each of the finger images;

comparing the average brightness of each of the finger images in the first comparison group with the average brightness of the first finger image, to obtain the average brightness difference of each of the finger images in the first comparison group;

comparing the average brightness of the at least one finger image in the second comparison group with the average brightness of the second finger image, to obtain the average brightness difference of each of the at least one finger image in the second comparison group;

counting a number of the average brightness differences of the finger images in the first and second comparison groups which are higher than a predetermined offset threshold; and when the count is higher than a predetermined count threshold, determining the finger images to present the liveness characteristic.

10. The optical identification method of claim 9, wherein the offset threshold is determined according to a breathing characteristic or a heartbeat characteristic of a user.

11. The optical identification method of claim 1, wherein the identification information of the finger includes a fingerprint of the finger or a motion trajectory of the finger.

* * * * *